INVENTOR.
Carlo Barassi
BY Stevens, Davis, Miller & Mosher
ATTORNEYS

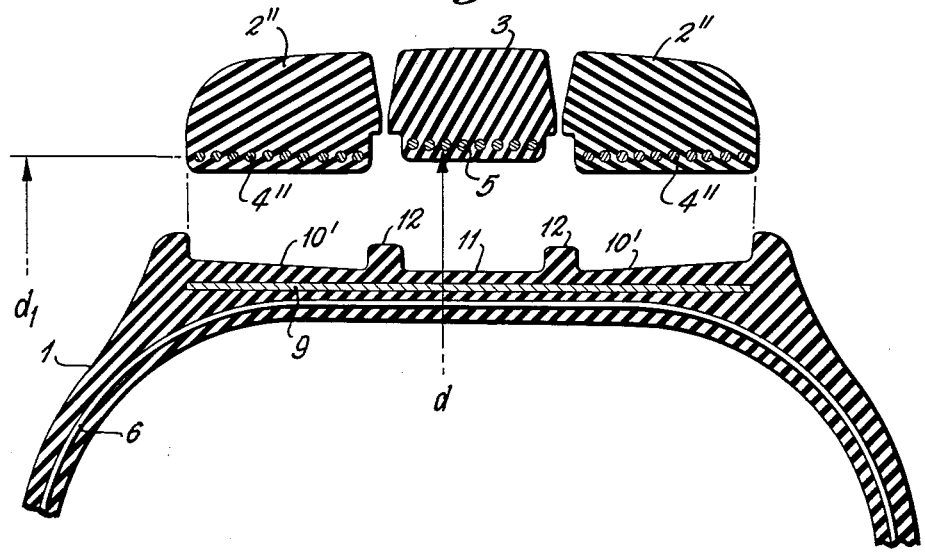
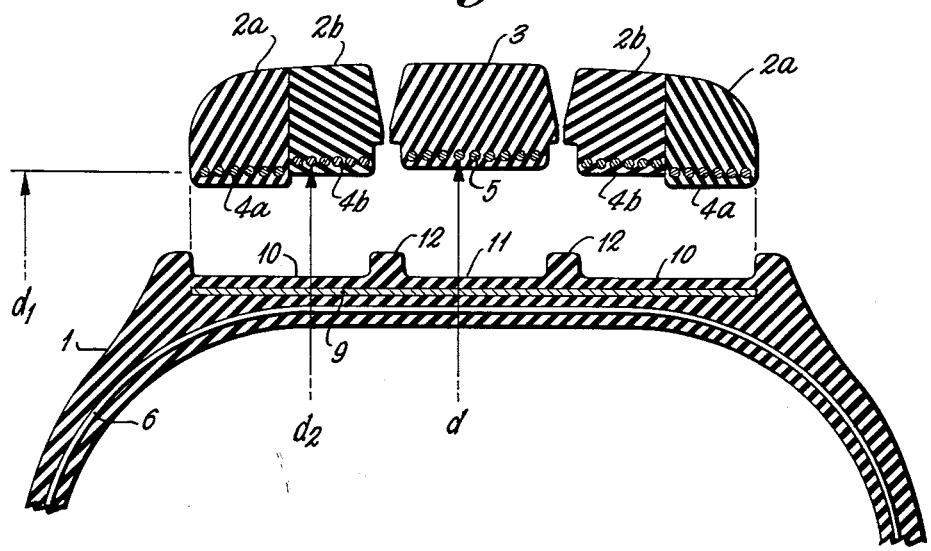

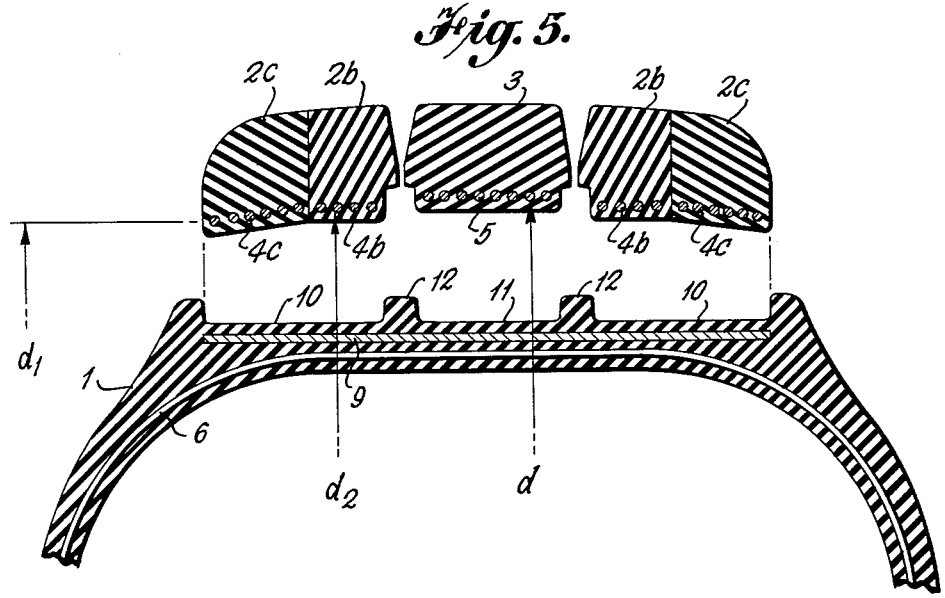
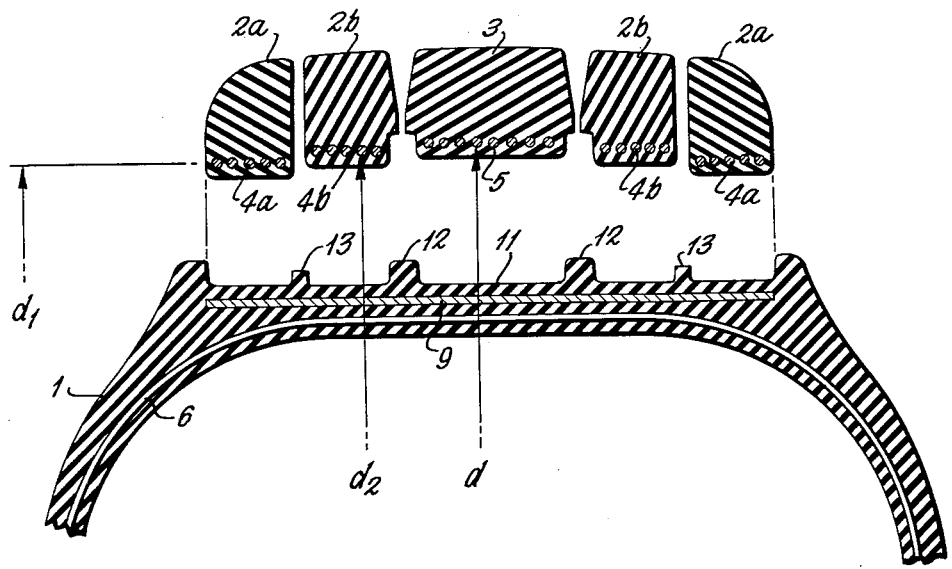

United States Patent Office 3,034,553
Patented May 15, 1962

3,034,553
PNEUMATIC TIRE WITH SEPARATE
TREAD RINGS
Carlo Barassi, Milan, Italy, assignor to Pirelli Societa per
Azioni, Milan, Italy, a corporation of Italy
Filed Oct. 27, 1960, Ser. No. 65,333
Claims priority, application Italy Oct. 29, 1959
7 Claims. (Cl. 152—176)

The present invention relates to a pneumatic tire of the type having a separate tread constituted by a plurality of separate tread rings. The separate rings are provided with internal reinforcements which make the rings substantially inextensible in the longitudinal direction. Furthermore, these rings are mounted in suitable grooves in the carcass of the tire.

More particularly, the present invention relates to a tire of the type referred to above wherein the reinforcements, especially in the lateral rings, are disposed so as to obviate any tendency for the carcass to detach from the rings as might, for example, be the case if the tire were subjected to abnormal and excessive transversal forces. This application is a continuation-in-part of my copending application, Serial No. 42,015 filed on July 11, 1960, now Patent No. 2,990,867, the latter, in turn, being a continuation-in-part of prior application Serial No. 739,918 filed on June 4, 1958, and now abandoned.

In the tire described in the aforementioned prior applications, the resistance elements, or reinforcing elements, in all of the rings are situated at the same distance from the axis of rotation of the tire. The reinforcing elements are constituted of cords having low elongation properties and made of a natural, artificial or synthetic textile material or of metallic material. The cords have a longitudinal or prevailingly longitudinal path; that is, they form angles of from about 0° to less than 20° with respect to the mid-circumferential plane of the tire. The carcass is a radial carcass, namely, one in which the cords have a radial or practically radial path. In other words, these carcass cords form an angle of about 0° and not exceeding 10° with respect to any plane passing through the axis of rotation of the tire. The rings are seated in suitable grooves provided on the periphery of the carcass and a breaker strip is located in the carcass between the grooves and the radial plies. The breaker strip is constituted by layers of cords which are parallel to one another in each layer and which are crossed with respect to the cords of an adjacent layer. The cords of all layers in the breaker strips are oriented in two directions, symmetrical with respect to the mid-circumferential plane of the tire, and are inclined with respect to said plane at angles ranging from 35° to 60°.

With regard to the tire of the type described above, it has been discovered that there is a tendency for the carcass to detach from the lateral tread rings under extreme conditions of service. For example, if the tire were partially deflated and, if the vehicle were travelling around a narrow curve at high speed, it is possible for this detachment to occur. Otherwise, under normal service conditions, this detachment would not actually take place, although the tendency to do so would always be present.

The present invention relates to an improvement over the tire described above wherein the above described disadvantageous tendency is largely eliminated. In accordance with the present invention, the lateral tread rings, or at least the outermost portions thereof, are characterized in that the internal reinforcements have a diameter smaller than the diameter of the reinforcement in the central tread ring or rings. The actual difference between these diameters depends upon the size and shape of the tire section and on the inflation pressure; in any event, the difference must not be greater than 2 percent of the diameter of the reinforcement in the central rings. This difference in diameters is not of such magnitude as to cause an appreciable increase in the wear due to the lack of uniformity of the rolling radius in the various rings; however, this difference in diameters is sufficient to insure a suitable fastening of the lateral rings to the carcass.

According to one embodiment of the present invention, the reinforcements of the lateral rings, instead of lying in a cylindrical surface coplanar with the reinforcements of the central rings, will be disposed in such a way as to lie in a conical surface whose axis is coincident with the axis rotation of the tire and whose diameter progressively decreases towards the laterally outermost edges of the tread.

Another embodiment of the present invention is one wherein the reinforcements in the lateral rings are substantially cylindrical but which have a diameter smaller than that of the reinforcement in the central ring.

A further embodiment of the present invention consists in dividing each lateral ring into two or more parts, each forming a separate ring having a particular type of reinforcement. The latter can be cylindrical where the diameter of the reinforcement in the outermost part is less than that of the innermost part, the diameters of all parts being less than the diameter of the reinforcement in the central ring.

A still further embodiment of the present invention is similar to the last mentioned embodiment wherein the outermost parts of each lateral ring have their reinforcements disposed in a substantially conical configuration, the diameters decreasing from the inside towards the laterally outermost portions of the tread.

In all of the above embodiments, the diameters of the reinforcements in the laterally outermost portions of the lateral rings are always less than the diameter of the central ring but by no more than two percent of the diameter of the central ring. In the two last-mentioned embodiments, the two portions of each lateral ring may be encased in a single groove or seat, or each portion can be provided with a separate seat, in which case additional longitudinal ridges are provided in the carcass.

Therefore, it is a principal object of the present invention to provide a tire of the type described above wherein the reinforcements in the lateral tread rings will be disposed in such a manner as to eliminate the tendency for the carcass to detach from the tread when the tire is placed under abnormal transversal forces.

Other and future objects and advantageous features of the present invention will hereinafter more fully appear in connection with a detailed description of the drawings in which:

FIGURE 3 is a view similar to FIGURE 2 of another modification of the present invention wherein the reinforcements in the laterally outermost rings have a uniform diameter smaller than the diameter of the reinforcements in the central ring;

FIGURE 4 is a view similar to FIGURE 3 showing a further embodiment of the present invention wherein the laterally outermost rings are each divided into two parts in which the diameter of the reinforcements are different from each other and from the diameter of the central ring;

Figure 2:
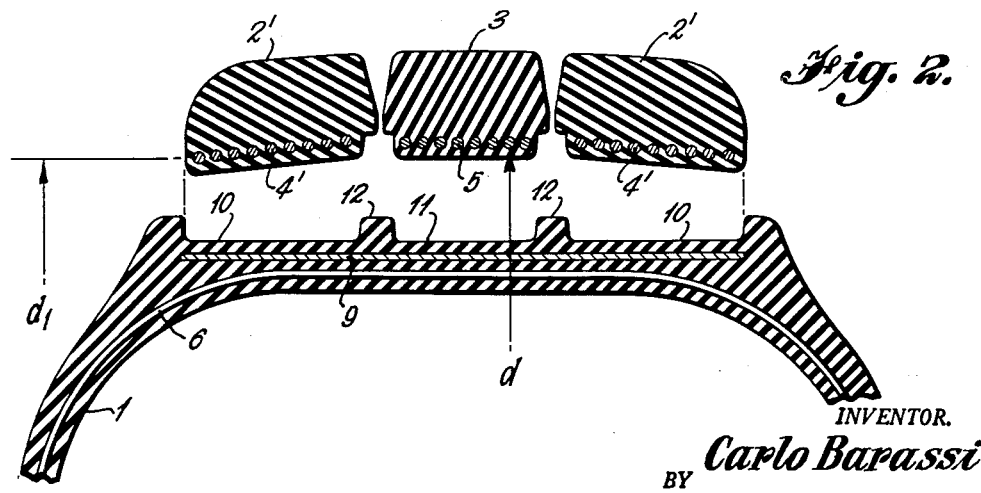
FIGURE 2 is a fragmentary transverse cross-sectional view of a tire constructed in accordance with one embodiment of the present invention wherein the reinforcements in the laterally outermost rings are disposed in a conical arrangement.

FIGURE 5 is a view similar to FIGURE 2 showing a still further embodiment of the present invention wherein the laterally outermost rings are divided into two parts in such a manner as to incorporate the combined features of FIGURES 2 and 3; and FIGURE 6 is a view similar to FIGURE 4 showing a modification thereof wherein longitudinal ridges are interposed between the parts of the laterally outermost rings.

Figure 1:
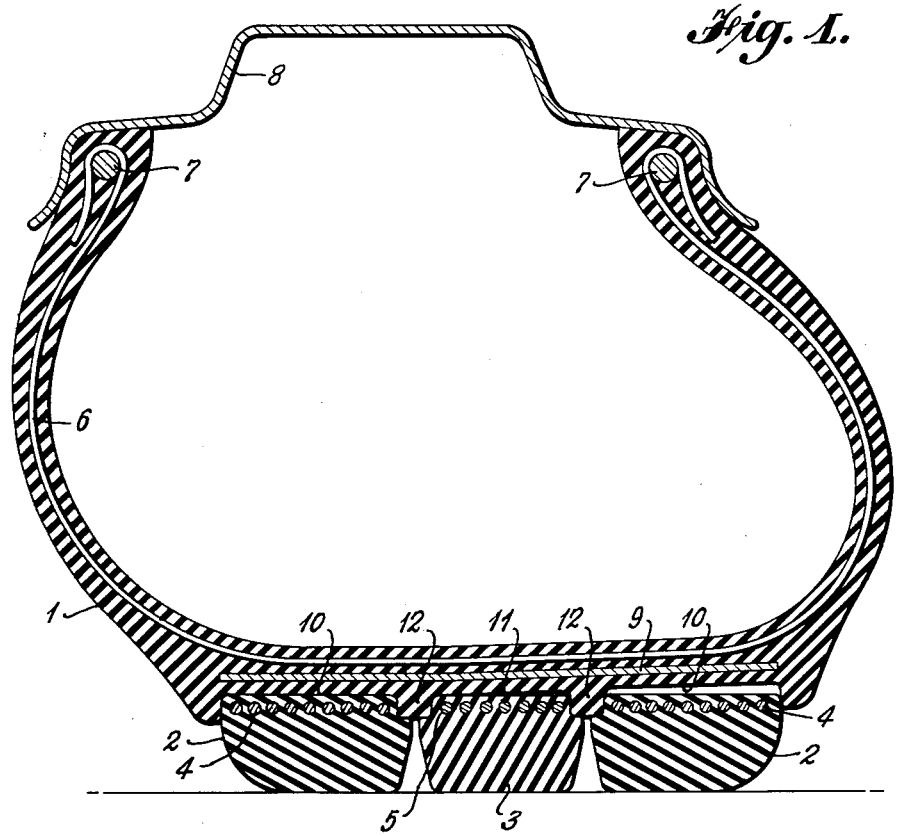
FIGURE 1 is a transverse cross-sectional view of a tire bearing against the ground and being subjected to the action of a transversal force, so as to illustrate the problem solved by the present invention.

Referring to the drawings in detail, FIGURE 1 shows a pneumatic tire having a carcass 1 and a tread formed of two lateral rings 2 and of a central ring 3; the lateral and central rings are provided with reinforcements 4 and 5, respectively, all of which are of equal diameter and which are arranged in a substantially cylindrical configuration. The carcass also includes plies 6 which have a radial or practically radial path. In other words, the cords of the plies 6 form an angle of about 0° (at any event not exceeding 10°) with respect to any plane passing through the axis of rotation of the tire. The plies are wound around conventional bead wires 7 and the tire itself is diagrammatically shown as being mounted on a rim 8.

Finally, the tire shown in FIGURE 1 includes a breaker strip 9 mounted within the tire between the carcass plies and the tread portion, represented by the rings 2 and 3. The breaker strip is constituted by layers of cords which are parallel to one another in each layer and which are crossed with respect to cords of an adjacent layer; therefore, the cords of all layers of the breaker strip are oriented in two directions symmetrical with respect to the midcircumferential plane of the tire and are inclined with respect to said plane at angles ranging between 35 degrees and 60 degrees, as is the case with conventional breaker strips.

The carcass is provided with lateral grooves 10 constituting seats for the lateral rings 2 and a central groove 11 constituting a seat for the central ring 3; these grooves are separated by ridges 12.

As indicated heretofore, FIGURE 1 represents a tire of the type having removable tread rings wherein the tire is bearing against the ground while under the action of a transversal force. FIGURE 1 represents an exaggerated condition showing how the carcass has a tendency to detach from the lateral ring 2 appearing at the right hand side of this figure. Under conditions of normal service this detachment does not really occur, although it could take place if the tire were partially deflated and if such a deflated tire were acted upon by a transverse force of considerable magnitude, for example, as when the tire might be running on a narrow curve at high speed. FIGURES 2 to 6 represent various modifications of the tire shown in FIGURE 1 for the purpose of overcoming the above disadvantageous tendency.

In FIGURE 2 the carcass 1, including the carcass plies 6 and the breaker strip 9, is substantially the same as that shown in FIGURE 1. Also, the central tread ring 3 including its reinforcements 5 is substantially the same as in FIGURE 1. However, the lateral tread rings 2′ have reinforcements 4′ arranged in a substantially conical disposition; that is, the innermost portions or loops of the reinforcement 4′ have a diameter $d$ equal to the diameter $d$ of the reinforcement 5 in the central ring 3; the outermost portions or loops of the reinforcements 4′ have a diameter $d_1$ which is less than the diameter $d$ referred to above. As can be seen from a consideration of FIGURE 2, the reinforcement 4′ diminishes gradually and uniformly from its larger diameter $d$ to its smaller diameter $d_1$, the latter being less than $d$ by no more than 2 percent of $d$. It should be noted that the various diameters referred to as $d$, as well as the subgeneric designations thereof, represent, in each instance, twice the distance measured from the rotational axis of the tire (not shown in FIGURES 2 to 6) to the particular reinforcement involved.

FIGURE 3 represents an embodiment of the invention in which the reinforcements 4″ of the laterally outermost rings 2″ have a constant diameter $d_1$ which, as indicated above is less than the diameter $d$ of the reinforcement 5 in the central ring 3. It might be noted, in connection with FIGURE 3, that the carcass portion 1 has its lateral seats 10′ disposed in a conical arrangement where the diameter of the rubber portion underlying the tread increases in the lateral direction from the inside towards the outside of the tread. This particular expedient may also be employed in conjunction with the other figures of the drawings, as desired.

FIGURE 4, shows a modification wherein the lateral rings are composed of two parts, $2_a$ and $2_b$, each having its own reinforcement $4_a$ and $4_b$, respectively, both being of substantially cylindrical configuration. The diameter of the reinforcement $4_a$ is designated as $d_1$ which, as indicated heretofore, is smaller than $d$ of the central reinforcement 5 but by no more than 2 percent of $d$. The diameter $d_2$ of the reinforcement $4_b$ will have a value between $d$ and $d_1$.

FIGURE 5, as indicated heretofore, is similar to FIGURE 4 but represents a combination of the features of FIGURES 2 and 3. The lateral rings are divided into two parts $2_b$ and $2_c$ having reinforcements $4_b$ and $4_c$, respectively. The segment $2_b$ with its reinforcement $4_b$ is substantially the same as that described above with reference to FIGURE 4; that is, the reinforcements $4_b$ have a constant diameter equal to $d_2$. However, the outer segment $2_c$ has a diameter decreasing gradually and uniformly from $d_2$ (at its laterally innermost edge) to $d_1$ (at its laterally outermost edge).

FIGURE 6 represents a slight modification of FIGURE 4 wherein the lateral rings are also formed of the two separate portions $2_a$ and $2_b$; however, the carcass is provided with additional ridges 13 which serve as partitions between the portions $2_a$ and $2_b$ of the lateral rings.

It should be apparent from the above description that all of the various embodiments falling within the purview of the present invention are provided with lateral tread rings wherein the reinforcements, at least in the laterally outermost portions of these tread rings, are of a lesser diameter than the diameter of the reinforcements in the central tread ring or rings. The effect of this difference is to cause the outer edges of the lateral tread rings to dig or "bite" into the carcass so as to insure a perfect fastening of the lateral rings on the carcass. As indicated above, the maximum difference in diameters should not exceed more than two percent of the diameter of the central reinforcement, such that no appreciable increase in wear will result from the difference in rolling radius in the various tread rings.

Whereas, the present invention has been described in particular relation to the various embodiments illustrated and described herein, it should be understood that other and further modifications might be made within the spirit and scope of this invention.

What is claimed is:

1. In a pneumatic tire having a carcass in which the cords of the carcass plies are disposed substantially radially of the tire, said carcass being provided with a plurality of longitudinal ridges on the outer periphery of said carcass, said ridges being spaced from one another in lateral direction so as to form longitudinal grooves, each groove having in transverse cross-section an outer width which is at least equal to the width at its base, a detachable tread comprising at least three separate tread rings receivable in the grooves of said carcass, substantially inextensible reinforcing elements embedded in each tread ring in proximity of the inner periphery of each tread ring, said reinforcing elements being disposed in a prevailingly longitudinal direction and extending for practically the whole width of each ring, the inner diameter of each ring being smaller than the diameter of the carcass in the area adapted to receive said ring when said carcass is inflated devoid of said rings, the improvement wherein the reinforcing elements in at least the laterally outermost portions of the lateral tread rings are of lesser diameter than that of the reinforcing elements in the central portion of the tread, while, in the deflated carcass, the laterally outermost portions of the grooves for the lateral tread rings have a diameter at least equal to the diameter of any groove for a central ring.

2. A pneumatic tire as set forth in claim 1 characterized in that the difference between the diameter of the laterally outermost portions of the lateral tread rings and the diameter of the reinforcing elements in the central portion of the tread is not greater than two percent of the latter diameter.

3. A pneumatic tire as set forth in claim 2 characterized in that the reinforcing elements in the lateral tread rings lie in conical surfaces whose axes are coincident with the axis of rotation of the tire and whose diameters decrease progressively in a direction from the center of the tread towards the tread edges.

4. A pneumatic tire as set forth in claim 2 characterized in that the reinforcements in the lateral rings lie in cylindrical surfaces whose axes are coincident of the axis of rotation of the tire and wherein said tire is provided with a central tread ring having reinforcing elements lying in a cylindrical surface coaxial with the axis of rotation of the tire, the diameter of the reinforcements in the lateral rings being smaller than that of the reinforcing elements in the central ring.

5. A pneumatic tire as set forth in claim 2 characterized in that the separate tread rings comprise a central ring and two lateral rings, each of the lateral rings being divided into at least two parts, each part constituting an independent ring.

6. A pneumatic tire as set forth in claim 5 characterized in that the reinforcing elements in each part lie in cylindrical surfaces such that the diameters of the reinforcements in the parts of each ring decrease progressively from one part to the next towards the tread edges.

7. A pneumatic tire as set forth in claim 5 characterized in that the reinforcements of the outermost parts of the lateral tread rings have a conical shape whose diameter decreases from the inside towards the tread edges and further characterized in that the innermost parts of each lateral tread ring have a cylindriacl shape whose diameter is between the maximum diameter of the conically-shaped reinforcing elements and that of the reinforcing elements of the central tread ring.

References Cited in the file of this patent
UNITED STATES PATENTS 2,254,329     Stephens _____ Sept. 2, 1941
2,874,742     Lugli _____ Feb. 24, 1959